United States Patent [19]

Djorup

[11] 4,206,638
[45] Jun. 10, 1980

[54] DIRECTIONAL HEAT LOSS ANEMOMETER TRANSDUCER

[76] Inventor: Robert S. Djorup, 20 Lovewell Rd., Wellesley, Mass. 02181

[21] Appl. No.: 966,792

[22] Filed: Dec. 6, 1978

[51] Int. Cl.$^2$ .......................... G01P 5/12; G01W 1/04
[52] U.S. Cl. ......................................... 73/189; 73/204
[58] Field of Search .......................... 73/188, 189, 204

[56] References Cited

U.S. PATENT DOCUMENTS

| | | | |
|---|---|---|---|
| 2,981,104 | 4/1961 | Auger | 73/189 |
| 3,991,624 | 11/1976 | Davies | 73/189 |
| 4,024,761 | 5/1977 | Djorup | 73/204 |

*Primary Examiner*—Herbert Goldstein
*Attorney, Agent, or Firm*—Robert G. Mentag

[57] ABSTRACT

A directional heat loss anemometer transducer for sensing both the speed and direction of motion of a fluid, liquid or gas in which the transducer is immersed. The transducer is constructed of fine long cylindrical resistive conductors which are axially disposed about a supporting body wherein at least two conductors serve as a direction sensing pair which can also be used to determine impinging fluid speed. For flow in opposite directions across the transducer a third conductor can be used to independently sense speed when it is mounted so as to function as a freely supported fine cylinder. The direction sensing conductors are joined to the supporting body by an adhesive connecting means thereby preventing independent flow between the individual conductors of the conductor pair. The electrical conductors can be metallic or resistive films which are deposited on a cylindrical supporting body, or they may be individual wires of circular cross-section. Each conductor which is actively used is made of a material which exhibits a change in its electrical resistance as a function of temperature. Electrical connections are provided at each end of each conductor to permit each conductor to be separately excited by an electrical current. Typically, the transducer is operated in air so as to provide a non-moving parts means for measuring a particular component of wind speed, and a pair of orthogonally mounted similar transducers can be used to determine sine and cosine components of wind speed.

17 Claims, 15 Drawing Figures

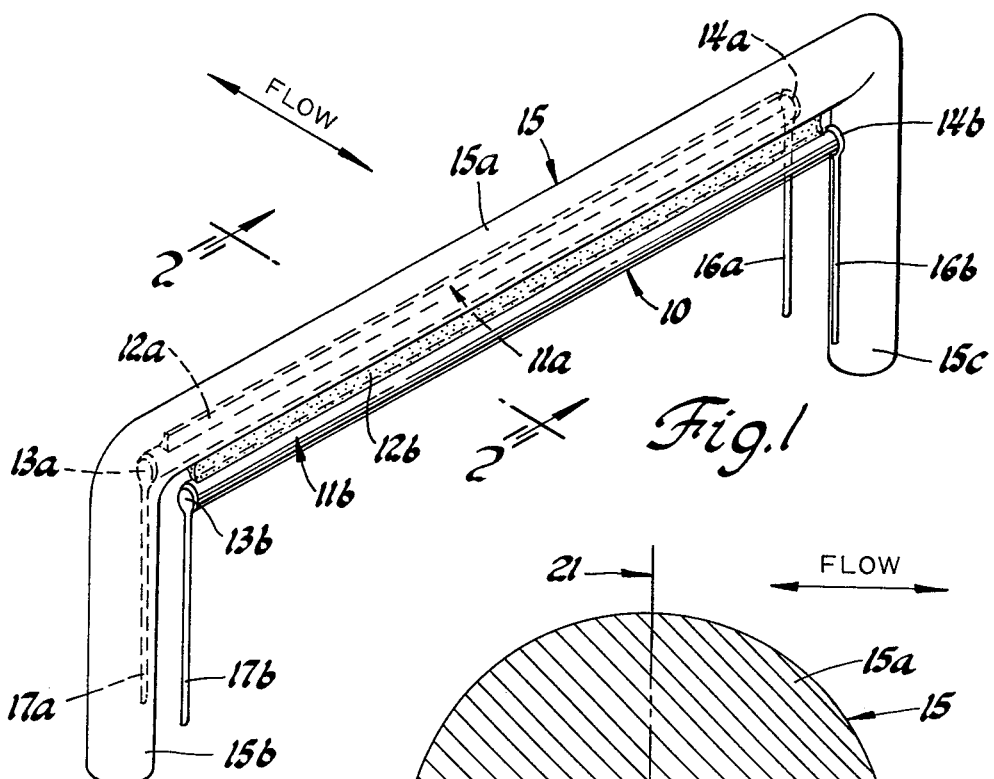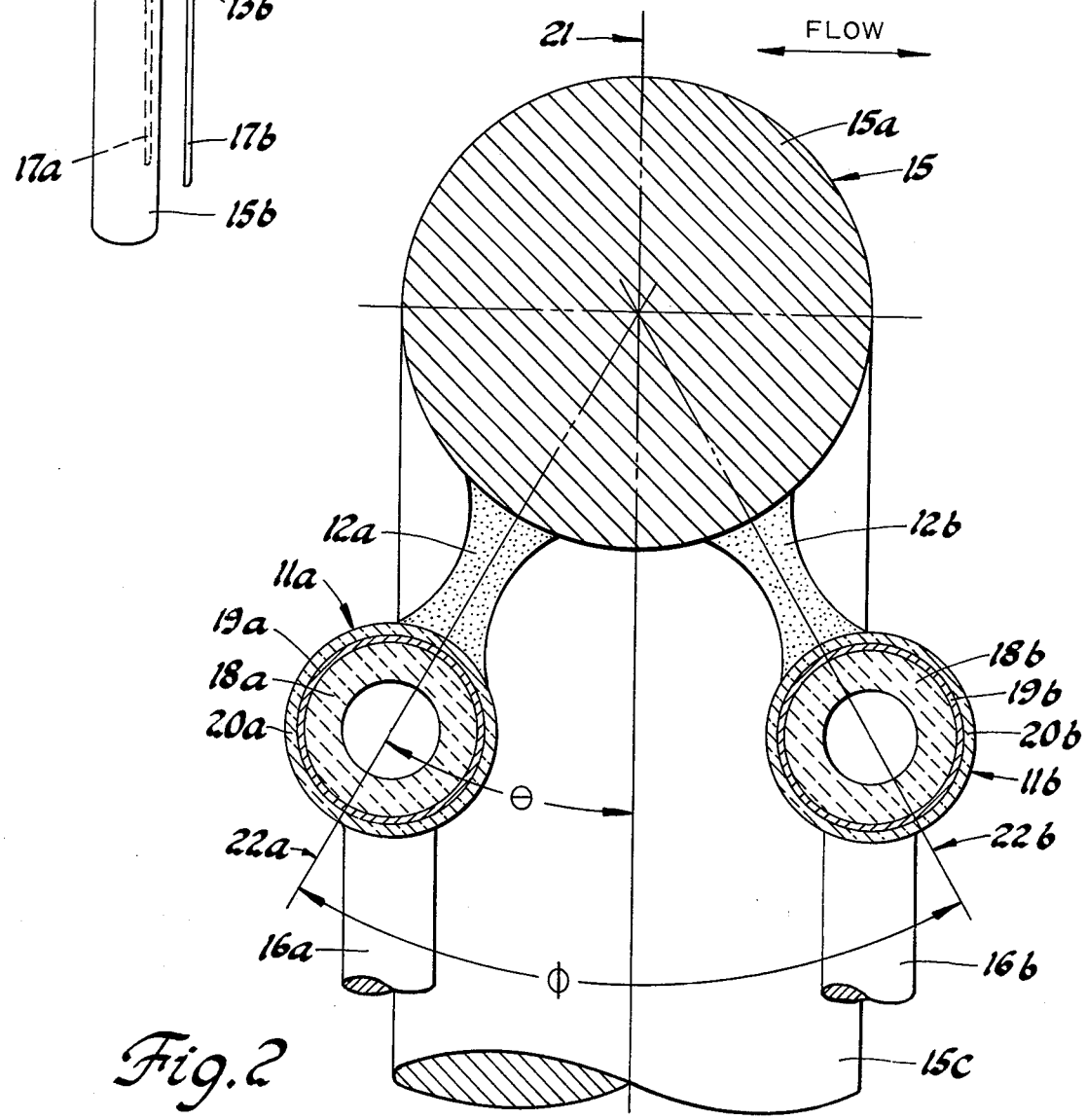

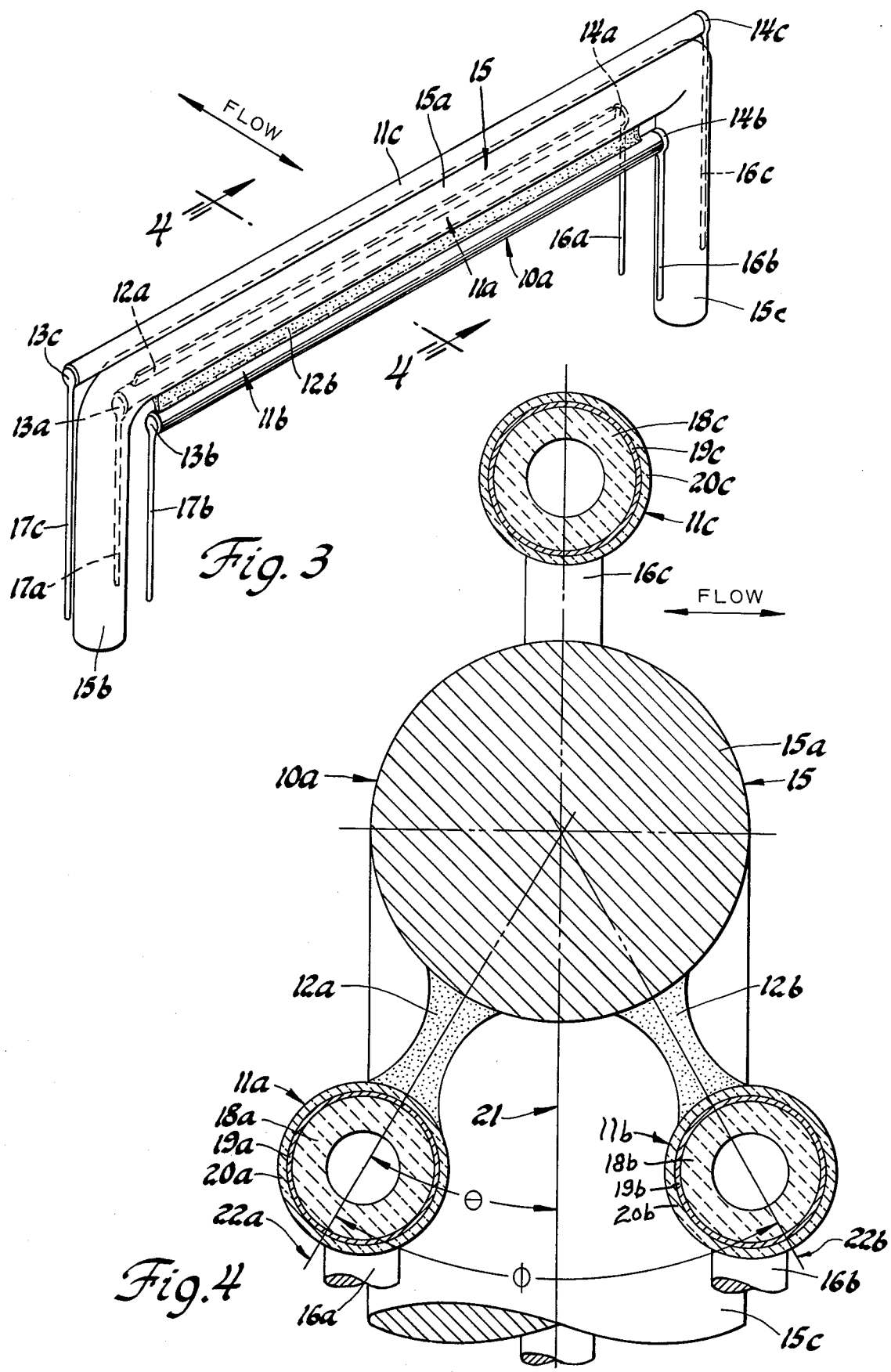

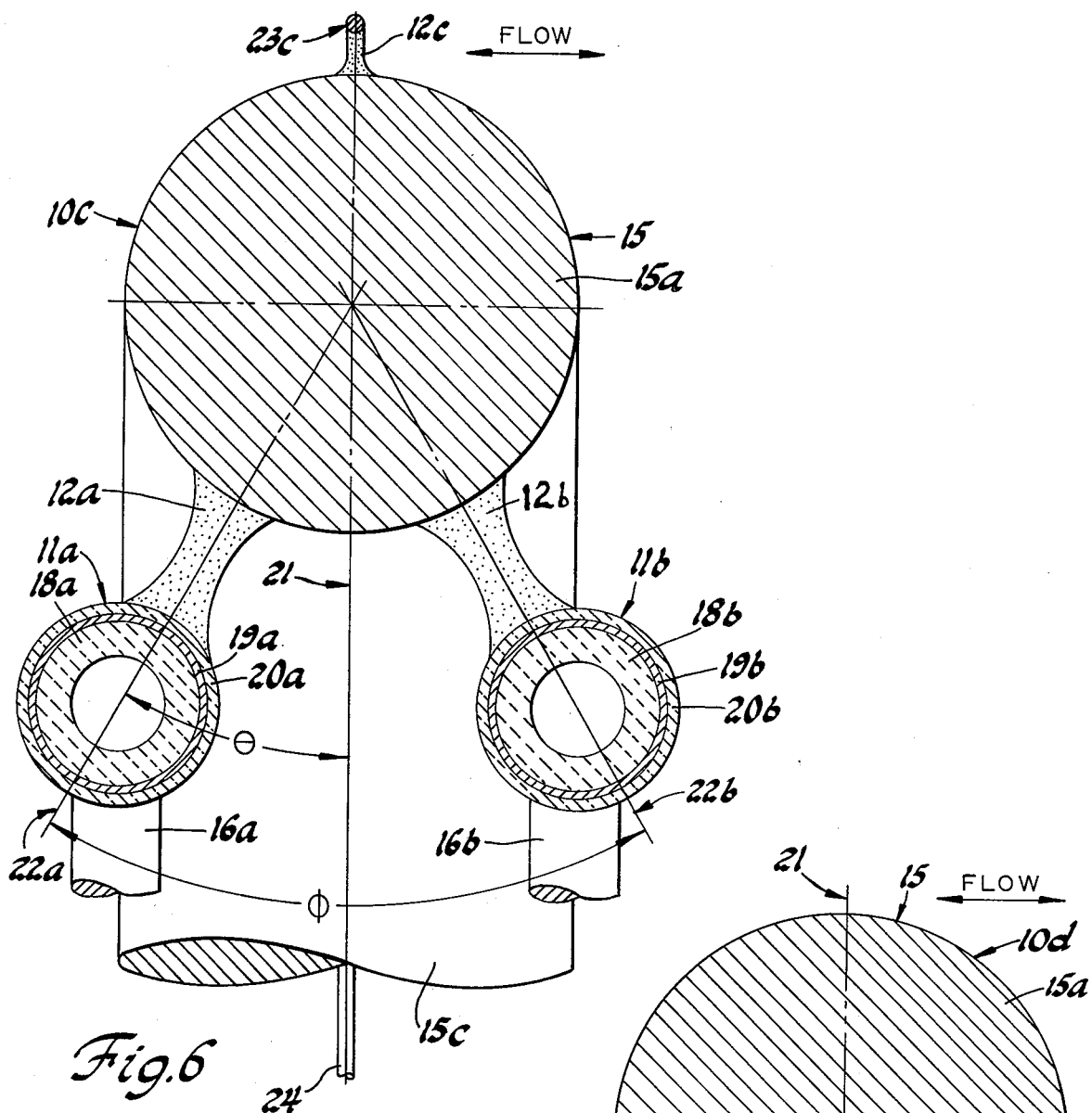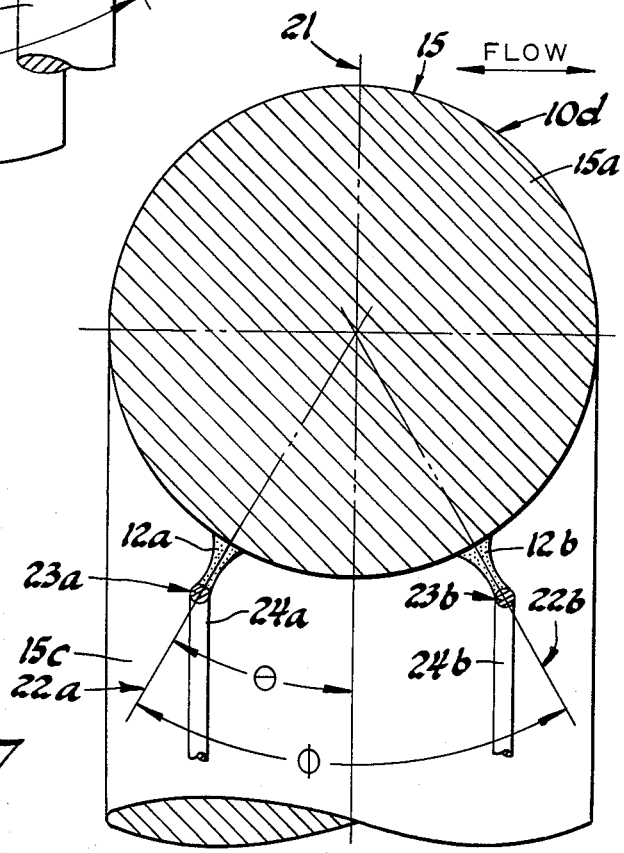

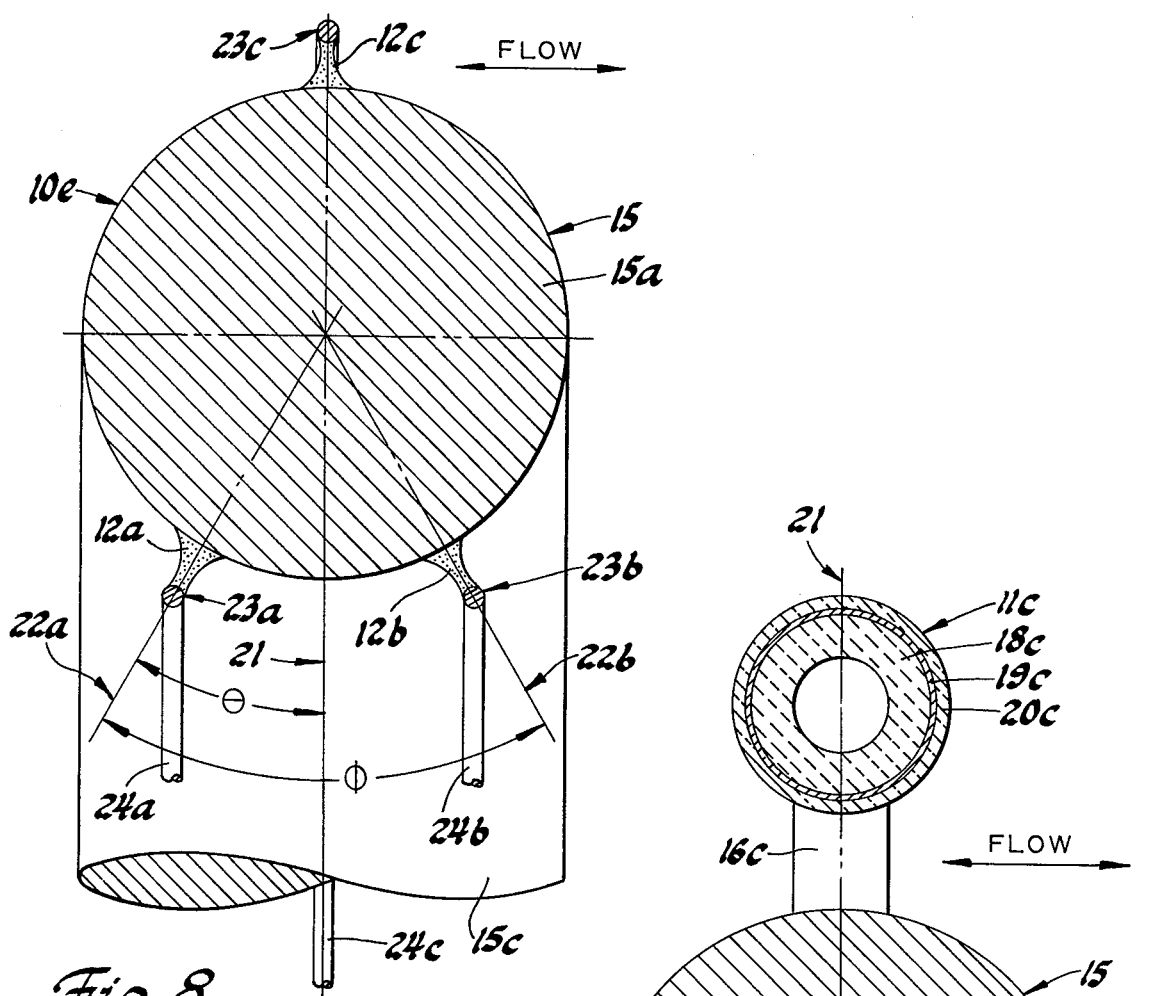
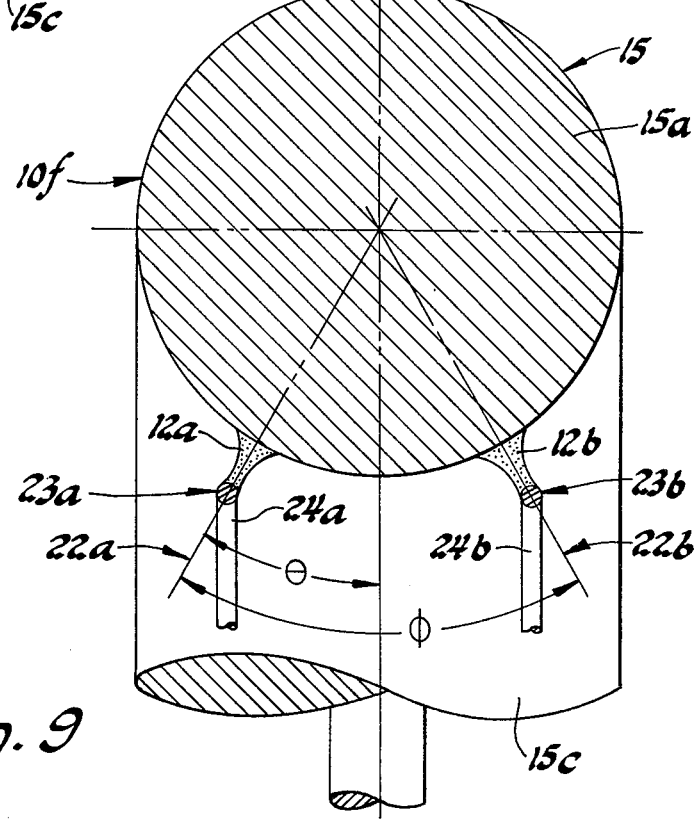
Fig. 8
Fig. 9

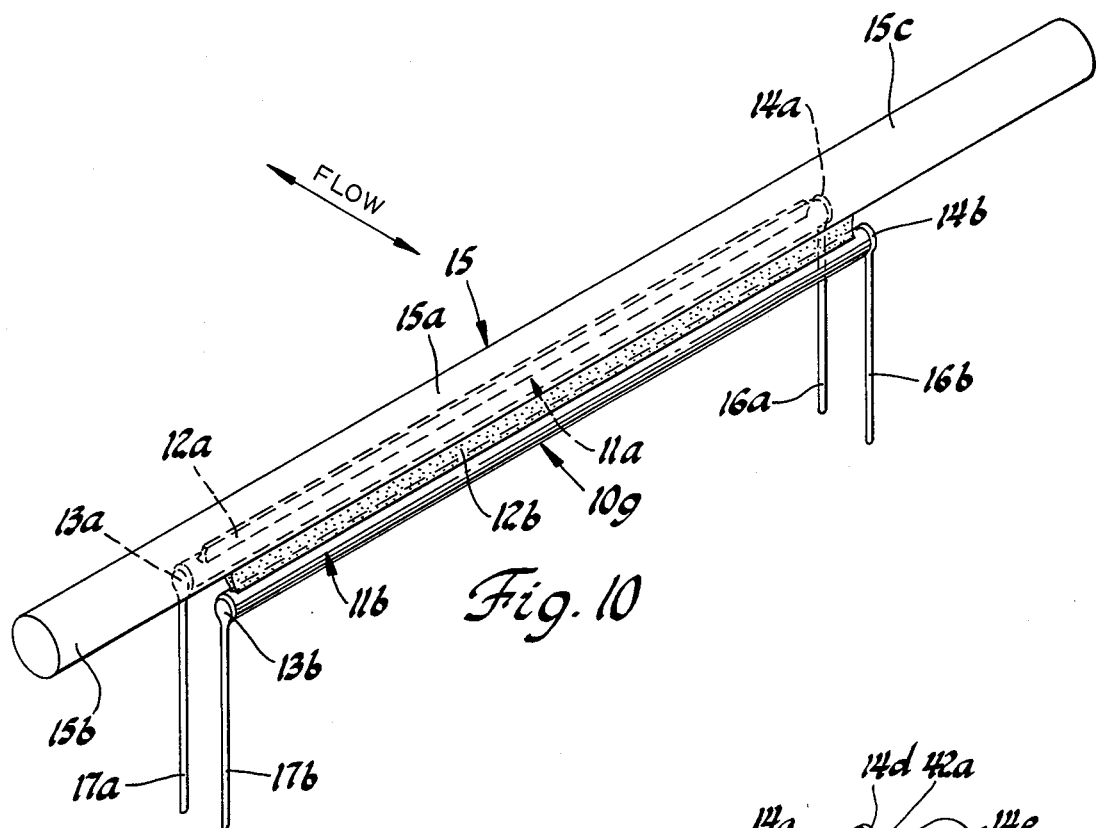
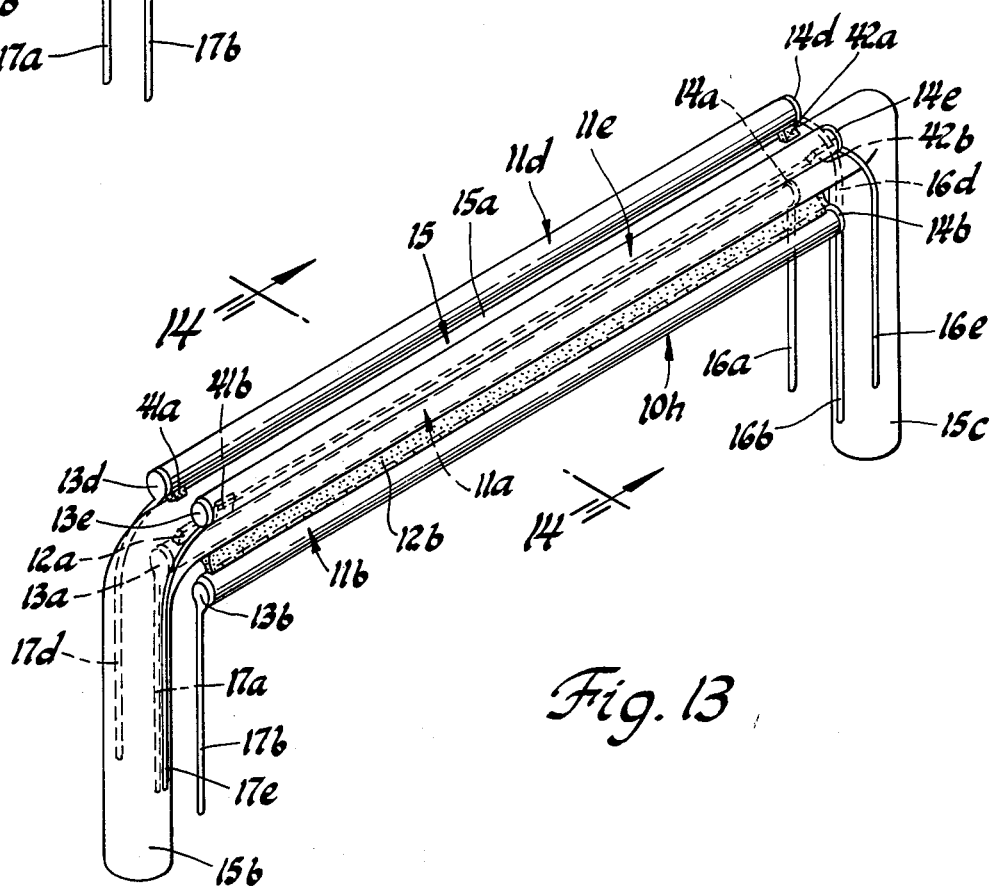

DIRECTIONAL HEAT LOSS ANEMOMETER TRANSDUCER

BACKGROUND OF THE INVENTION

1. Field of the Invention

This invention relates generally to anemometer sensing apparatus for determining the motion of a fluid mass which surrounds the transducer or, conversely, motion of the transducer through the fluid. The invention is particularly concerned with a directional heat loss anemometer transducer for sensing both the speed and direction of motion of a fluid, as a liquid or a gas, in which the transducer is immersed.

2. Description of the Prior Art

It is known in the anemometer sensing apparatus art to employ hot wire and hot film anemometer transducers. Examples of prior art thermal anemometer sensors, and circuits therefor, are shown in U.S. Pat. Nos. 3,138,025, 3,333,470, 3,352,154, 3,604,261, 3,900,819 and 4,024,761. The present invention overcomes several disadvantages or deficiencies which are found in the prior art anemometer sensors.

Two significant deficiencies which may be observed to be characteristic of the prior art transducers are their relative insensitivity at low flow angles which are parallel or nearly parallel to the transducer's major dimensional axis, and their susceptibility to dissimilarities of speed response from side to side. An ideal transducer will exhibit clean smooth axis crossings when the transducer's polar response characteristic is displayed or graphically plotted. Prior art transducers often rely on artifices such as the introduction of electrical "dither" signals to aid in lobe switching from side to side. This in effect provides a "synthetic" speed signal through the axis crossing region rather than a signal which is truly derived from the direction transducer itself.

SUMMARY OF THE INVENTION

The present invention uses a direction sensing pair of conductors which takes advantage of the natural turbulent wake occurring when virtually any geometric body is placed in a moving fluid. By so arranging the sensing pair of conductors' geometric positioning, in respect to that body, an aerodynamic "dither" signal is introduced into the direction sensor signal output for low angle flow. In effect, a variable amount of random turbulence is added to the output of the direction sensing pair of conductors as a function of incidence angle. The least turbulence is introduced for flow normal to the major axis of the transducer. A pronounced flow, from one side or the other side, causes the self-generated turbulent wake to be swept away from the transducer elements.

The present invention also uses a single cylindrical speed sensor as a part of the transducer, so that speed sensor response from side to side is ideally matched. Said matching occurs because the same particular sensing element is used for all speed measurements.

The physical structure of the transducer is quite rugged and it can be used in fluids which are denser than air. When the transducer is used in sea water or fresh water, lower conductor operating temperatures are generally used. Typical transducer operating temperatures in air range from less than 25 degrees Celsius to more than 150 degrees Celsius, above ambient temperature. When the transducer is used in water, typical temperatures are 10 to 25 degrees Celsius, above ambient water temperature. Where environmental abuse is expected, and extreme ruggedness is paramount, performance can be somewhat compromised by using the direction pair of conductors alone for both speed and direction measurement. In such a case the direction pair of conductors is physically mounted under the protective lee of the heavy central supporting bar.

The directional heat loss anemometer transducer of the present invention includes at least two similar, thermally and physically separated resistive electrical conductors. Each of said electrical conductors has a length at least equal to the largest cross section dimension of the conductor. In one type of embodiment of the invention, each of said electrical conductors includes a hollow, tubular, electrically non-conductive refractory cylindrical substrate supporting body extending the length of the conductor, a conductive resistance film having a non-zero temperature coefficient of resistance adhered to the outer surface of the substrate body and extending over the length of the substrate body, and an overall protective coating which continuously extends over the outer surface of the conductive resistance film over the entire length of the conductive resistance film. In another type of embodiment the electrical conductors are wires, with solid cross sections. A cylindrical support element is centrally disposed between and alongside the two resistive electrical conductors. The cylindrical support element may be straight or it may have a straight middle section and two right angled legs bent to form a U shape. The electrical conductors are disposed as a parallel pair finitely separated, and mounted parallel to and in close proximity to the straight middle section of the cylindrical support element. Connective bridging means is operatively disposed between each of said electrical conductors and said central support, where the plane containing the parallel central axes of the two conductors is perpendicular to the plane which is defined by the axis of the cylindrical support element. The briding means closes the space between said conductors and the cylindrical support element thereby preventing connected flow completely around one conductor of the pair of two conductors, independent of the other conductor. The two conductors are supported in the protected lee of the cylindrical support element. Each of the electrical conductors is provided with electrical connection means, whereby each electrical conductor can be electrically heated by an electrical current passed through each conductor.

While it will be apparent that the preferred embodiments of the invention herein disclosed are well calculated to achieve the results aforestated, it will be appreciated that the invention is susceptible to modification, variation and change.

BRIEF DESCRIPTION OF THE DRAWINGS

FIG. 1 is a perspective view of a directional heat loss anemometer transducer made in accordance with the principles of the present invention.

FIG. 2 is an elevational section view of the directional heat loss anemometer transducer structure illustrated in FIG. 1, taken along the line 2—2 thereof, and looking in the direction of the arrows.

FIG. 3 is a perspective view of a second embodiment of a directional heat loss anemometer transducer made in accordance with the principles of the present invention and which uses a third cylindrical sensing element as a separate speed sensor.

FIG. 4 is an elevational section view of the directional heat loss anemometer transducer structure illustrated in FIG. 3, taken along the line 4—4 thereof, and looking in the direction of the arrows.

FIG. 6 is an elevational section view similar to FIG. 5, and illustrating a fourth embodiment wherein the third cylindrical sensing element is a wire rather than a film sensor.

FIG. 7 is an elevational section view, similar to FIG. 2, and illustrating a fifth embodiment wherein the direction sensing elements are wires rather than films.

FIG. 8 is an elevational section view, similar to FIG. 5, and illustrating a sixth embodiment wherein the three sensing elements are wires rather than films.

FIG. 9 is an elevational section view, similar to FIG. 4, and illustrating a seventh embodiment wherein the directional sensors are wires rather than films.

FIG. 10 is a perspective view of a directional heat loss anemometer transducer made in accordance with the principles of the present invention, and showing an eighth embodiment which uses a straight bar-like support rather than a formed support.

FIG. 13 is a perspective view of a directional heat loss anemometer transducer made in accordance with the principles of the present invention, and showing a ninth embodiment which uses two pairs of cylindrical sensing elements, or four sensing elements, for sensing both fluid speed and direction.

DESCRIPTION OF THE PREFERRED EMBODIMENTS

Figure 5:
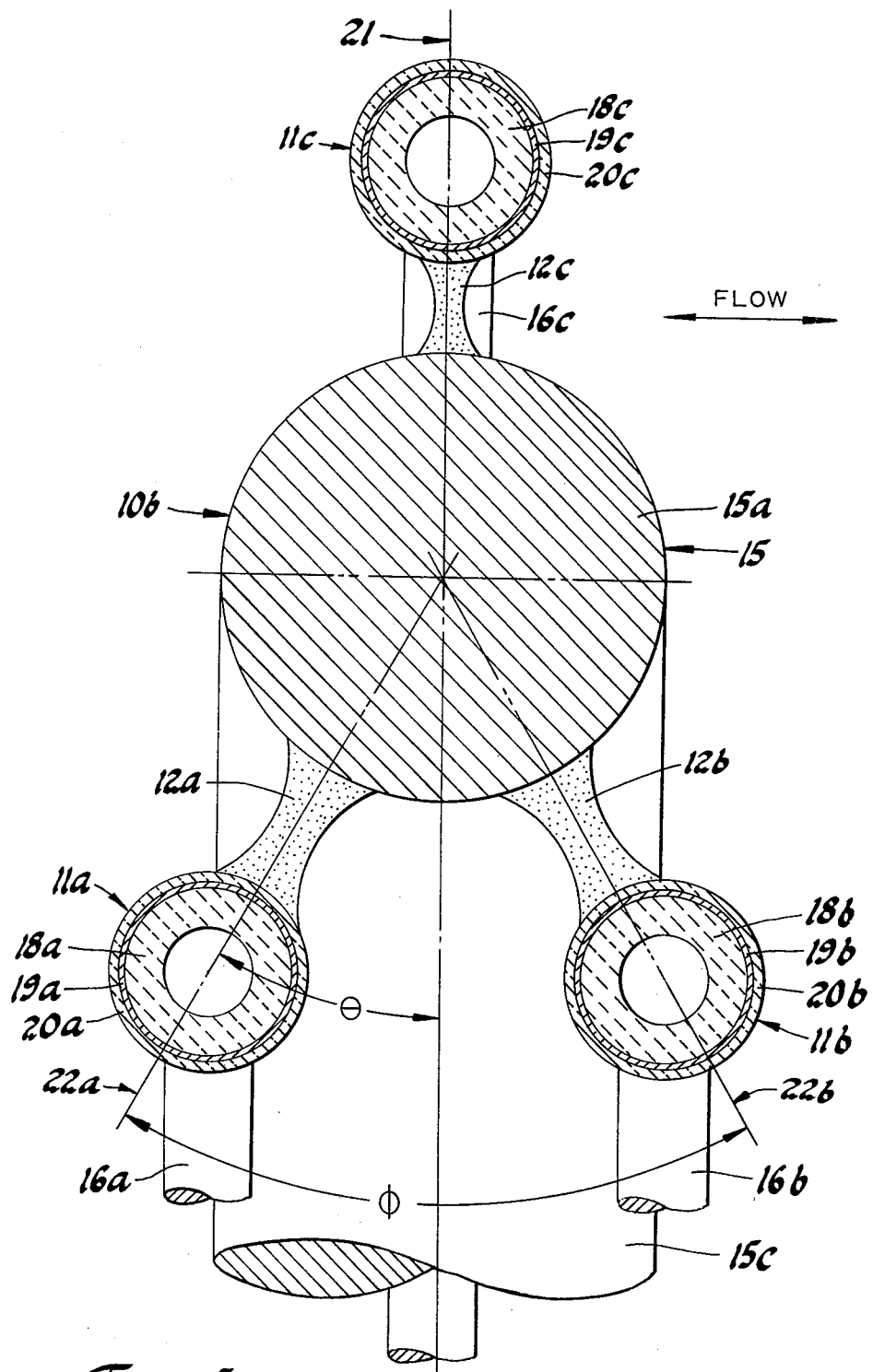
FIG. 5 is an elevational section view, similar to FIG. 4, and illustrating a third embodiment wherein the third cylindrical sensing element is physically joined to the mechanical support.

Referring now to the drawings, and in particular to FIG. 1, the numeral 10 generally designates a directional heat loss anemometer transducer constructed in accordance with the principles of the present invention. The transducer 10 includes two cylindrical, parallel sensing elements or members, generally indicated by the numerals 11a and 11b, which are resistive sensing elements whose lengths are sustantially greater than their diameters. Typically, the sensing members 11a and 11b may have an outside diameter of 0.6 mm, with an overall length of 25 mm, therefore having a length to diameter ratio of almost 42 to 1. As shown in FIGS. 1 and 2, the elements 11a and 11b are physically separated from each other, and they are joined or connected along their length to a larger diameter cylindrical support member, generally indicated by the numeral 15, by an adhesive or other bridging means 12a and 12b, respectively. The sensing elements 11a and 11b are similar in construction, and they are thermally separated.

The pair of sensing elements 11a and 11b are mounted below and parallel to a cylindrical support member, generally indicated by the numeral 15. The bodies of the sensing elements 11a and 11b have electrical connective means 13a and 13b, respectively, and electrical connecting wires 17a and 17b, respectively, at one end thereof and like connection means 14a and 14b, respectively, and connecting wires 16a and 16b, respectively, at the other end thereof.

The support member 15 is shown as a rigid, U-shaped wire which can be made from plated steel or stainless steel. The support member 15 includes the central, cylindrical body portion 15a, and the two integral end mounting portions 15b and 15c. The end mounting portions 15b and 15c are disposed perpendicular to the central portion 15a. The end mounting portions 15b and 15c support the transducer 10 in an operative position. The bodies of the sensing elements 11a and 11b are uniformly covered with a resistive film, and the connection means 13a, 13b, 14a and 14b are made of similar material in order to avoid thermocouple junction effects, and thereby help to produce the lowest possible intrinsic noise level of the transducer. The connecting lead wires 16a, 16b, 17a and 17b are also constructed of a material which is similar to that used by the end connection means 13a, 13b, 14a and 14b, in order to also produce the greatest signal to noise performance ratio, thereby permitting the greatest possible dynamic operating range. The material usually used is annealed platinum metal, although other materials such as nickel can be used. Alternative materials which may be used for the sensing elements 11a and 11b are described in U.S. Pat. No. 3,352,154.

FIG. 2 illustrates a typical cross section for a directional heat loss anemometer transducer 10 of the construction shown in FIG. 1. The relative size of the parts of the transducer 10 can be understood from the fact that the cross section of the support member central portion 15a is made to a scale such that the diameter thereof, as shown, is approximately 1.6 to 1.8 mm. As shown in FIG. 2, the two sensing elements 11a and 11b are supported axially along the rigid support member central portion 15a which can be made of steel, plated steel, stainless steel, plastic, or other rigid material which is shaped as shown in FIG. 1, in order to provide means for mechanical mounting and support of the transducer 10. The support member 15 also provides a means for aerodynamically disturbing the end flow along the sensing elements 11a and 11b which are mounted directly within the U shape of the support member 15 and parallel to the long straight central section or cross bar 15a. A typical diameter of the cross-section of the support member 15 is two or three or more times of the sensing members 11a and 11b, and in the configuration shown in FIGS. 1 and 2, the diameter is about 1.6 mm to 1.8 mm. The operation of each conductor of the direction sensing pair of conductors 11a and 11b will be similar when incident flow is contained within the plane defined by the axis 21 of the U shape of the support member 15 which, in FIG. 2, is shown to be a vertical plane.

As shown in FIG. 2, the sensing element 11a consists of an electrically non-conductive, hollow, tubular, non-porous, dense aluminum oxide refractory fine cylindrical substrate body 18a, upon the surface of which is uniformly deposited by firing, sintering or other deposition means, a thin film or coating of platinum metal 19a. The substrate supporting body 18a may be made from other suitable materials that are electrically non-conductive, such as aluminum silicate or anodized aluminum and other ceramic materials. The coating 19a has a further layer 20a of fused silica, glass, aluminum oxide, "TEFLON" or other protective coating material which provides abrasion and wear protection for the metal film 19a. Typical dimensions for the substrate body 18a are a cylinder diameter of 0.6 mm, with a bore diameter of 0.3 mm, and a length of about 25 or 30 mm. The thickness of the metal 19a is typically in the order of 2 to 10 microns, and it can vary in accordance with the particular coating method which is used. A dense homogeneous coating 19a with uniform grain structure will usually result in a lower resistance film, for a given film thickness. The sensing element 11b is constructed the same as 11a, and the same reference numerals have been used followed by the small letter "b".

A detailed discussion of film materials and film construction techniques and methods can be found on pages 358 through 365 of a book entitled "Resistance Temperature Transducers", by Virgil A. Sandborn of Colorado State University, published in 1972 by the Metrology Press, Fort Collins, Colorado.

As best seen in FIG. 2, cross flow between the sensing elements 11a, 11b and the support member portion 15a is prevented by use of the connecting bridges 12a and 12b. The material for bridges 12a and 12b can be a flexible, thermally isolating, adhesive material, such as Dow Corning 732 room temperature vulcanizing silicone rubber adhesive, which serves to firmly bridge the gap between the support member portion 15a and the sensing elements 11a and 11b. "TEFLON", silicone resin or other bridge materials may be used. The bridges 12a and 12b also can be formed by dipping the entire transducer in uncured bridging material and then allowing it to cure. Since the gaps to be filled are usually smaller than one millimeter across, the cross-sectional shape of each of the bridges 12a and 12b can be determined by surface tension effects without adverse result on transducer performance.

The gap between each of the sensing elements 11a and 11b and the support member portion 15a is used to prevent excessive non-productive heat loss from the sensing elements to the support member portion 15a. The gap also provides a means for non-symmetrical flow around the paired sensing elements 11a and 11b, in order that a differential determination of flow direction can be made. The gap between the sensing element 11a or 11b and the support member portion 15a is usually less than the diameter of the respective sensing element. Depending on the maximum speed to be measured in a given fluid, it is possible to not use a connecting bridge 12a or 12b if the surface of the sensing element 11a or 12b, respectively, is sufficiently close to the support so that the sensing element is well within the boundary layer of the support portion 15a, thereby causing high resistance to flow between the support portion 15a and the sensing element. This in itself can prevent the connected flow around the sensing elements 11a and 11b, which is necessary in order that a determination of direction can be made. The same effect can also be achieved by a modification of the cross-section geometry of the central support portion 15a. In any event, an unambiguous difference in flow around the paired sensing elements 11a and 12b, together with the central support portion 15a must be forced, so that the pair of sensing elements can effectively sense a difference in flow from either side of the transducer 10.

As shown in FIG. 2, the axis 21 of the central support portion 15a bisects the angle, $\phi$, between sensing element axes 22a and 22b. Angle $\theta$ should be large enough to prevent sensing element 11a from becoming in contact with sensing element 11b and should not exceed 60 degrees in order to prevent sensing elements 11a and 11b from coming within the stagnation region of central support portion 15a when it is ventilated by flow within the plane defined by the parallel axes of sensing elements 11a and 11b. For the proportions shown, where the diameter of the central support portion 15a is about three times the diameter of sensing elements 11a and 11b, a practical value for $\theta$ is 30 degrees. Typically, the central support portion 15a is two to four times the diameter of the individual sensing elements 11a and 11b, in order to provide structural rigidity and to generate a significant turbulent wake which passes over the sensing elements 11a and 11b when fluid flow passes across the central support portion 15a against elements 11a and 11b.

Typically, resistance of the platinum films 19a and 19b, for a transducer 10 of the scale indicated by the above, is in the 2 ohm to 6 ohm range at room temperature. Optimum film resistance is best determined by the characteristics of the electronic controller which is used to drive the transducer 10, and such factors as available power supply voltage, types of amplifiers used, operating method selected, and the like, are all under the control of the instrument designer.

A large ratio of sensing element, 11a and 11b, length to element diameter will produce angular sensitivity to airflow or fluid flow as the flow vector moves away from flow perpendicular to the cylindrical axes of elements 11a and 11b. Direction sensing is accomplished by sensing elements 11a and 11b as incident flow varies through 360 degrees, in the plane contained by the parallel axes of sensing elements 11a and 11b. Direction sign sense can be determined by electrical measurement of the change in relative resistance values of each sensing element 11a and 11b when they are compared with each other in a bridge circuit. An excellent description of this technique is provided on pages 77 through 80 of the book entitled "Hitzdraht-und Hitzfilmanemometrie", by von Dr. Ing. Herbert Strickert, published in 1974 by VEB Verlag Technik, Berlin.

FIG. 3 is a perspective view of a directional heat loss transducer 10a of the type shown in FIG. 1, and modified by the addition of a third cylindrical sensing element or member 11c which is mounted above and parallel to the support member portion 15a in such a manner whereby the sensing element 11c is equidistant from and parallel to sensing elements 11a and 11b. FIG. 4 is a cross section view of the transducer 10a, and the same reference numerals used to describe the embodiment of FIGS. 1 and 2 have been used to designate the various parts of the transducer 10a. Sensing element 11c is slightly longer than the straight central bar portion 15a of support member 15, and it has connection means 13c and 14c at each end and connecting wires 17c and 16c, respectively, in similar fashion to the structure of the sensing elements 11a and 11b. No bridging or adhesive connecting means is used, as is used for the direction sensing elements 11a and 11b, namely the bridging means 12a and 12b.

The third sensing element 11c is operated as a free cylinder over its length, thereby functioning as a speed sensing element which has a directional response characteristic, exclusive of sign determination, as a result of its large length to diameter ratio in much the same fashion as the individual cylindrical sensing elements 11a and 11b. Flow from opposite directions across the free cylinder produces identical results if the sensing element 11c is uniformly fabricated. Use of such an approach to speed sensing avoids any dissimilarities from one side to the other when flow is directed at the sensing element 11c from all angles within the plane parallel to the plane containing the axes of the direction pair 11a and 11b. As a result, it is possible to achieve excellent agreement with a Cosine law where maximum output is obtained when impinging flow is perpendicular to the axis of sensing element 11c, and minimum output is obtained when impinging flow is parallel to the long axis of the sensing element 11c.

Mechanical support can be provided for the third sensing element 11c by securing its lead wires 16c and 17c to the support legs 15b and 15c by means of an adhesive similar to that used for the connecting bridges 12a and 12b, where the adhesive is applied at either end of member 11c.

FIG. 4 illustrates a typical cross section for the directional heat loss anemometer 10a of the type shown in FIG. 3. The added third sensing element 11c is shown supported above the central support portion 15a. A platinum film 19c is applied to a substrate 18c, and it is protected by a film or coating 20c in the same manner as for the sensing elements 11a and 11b. It will be noted that there is an unfilled space between the third element 11c and the central supporting body portion 15a. The transducer configuration shown in FIG. 4 provides for maximum speed sensitivity with a minimum of heating power being lost to the support member 15 by conduction through a bridging means.

FIG. 5 illustrates the cross section of a modified three element transducer 10b which is the same as the transducer 10a of FIG. 4, but with the addition of a connecting bridge 12c between the third sensing element 11c and central support portion 15a. The same reference numerals used in FIGS. 3 and 4 are used to designate the various parts of the transducer 10b.

FIG. 6 illustrates another embodiment of a three element transducer 10c where the speed sensing element which is shown as the uppermost sensing element 11c in the embodiment of FIG. 3 is replaced by a long fine wire sensing element 23c, which is shown to be bridged by an adhesive means 12c to the central support portion 15a. The wire sensing element 23c can be fabricated from any suitable materials, such as platinum, tungsten, noble metal alloys, nickel, and nickel alloys. A platinum wire having a diameter of 0.254 mm with a length of 25.4 mm will have a room temperature resistance of about 5 ohms. Certain of the alloys will have higher room temperature resistance, but also will have lower temperature coefficients of resistance than the pure metal. Tungsten is stronger than platinum, and it does oxidize somewhat, but it has found wide usage in the hot wire anemometer art because of ease of availability in fine drawn sizes. The bridge 12c will materially aid in supporting the fine wire sensing element 23c. Larger diameter wires can be used, so long as the electrical controller design is adjusted to accommodate the substantially lowered resistance of the sensing element 23c. The direction sensing elements 11a and 11b are shown in the same relationship as those described for the embodiment of FIGS. 1 and 2.

An excellent discussion of hot wire practice and fabrication can be found in Chapter V of the previously mentioned book "Resistance Temperature Transducers" by Virgil A. Sandborn, and Chapter 2. of the previously referenced book "Hitzdraht-und Hitzfilmanemometrie" by H. Strickert, although the latter volume includes less practical information than the former volume, but does more extensively explore the use and application of hot wires and hot films in anemometry.

FIG. 7 illustrates a cross section of a modified two element transducer 10d which is the same as the transducer 10 of FIGS. 1 and 2, but with wire sensing elements 23a and 23b substituted for the film sensing elements 11a and 11b. Lead wires 24a and 24b are attached to the sensing wires 23a and 23b, respectively, at each end thereof, by any suitable means, as by welding or brazing. The same reference numerals as used in FIGS. 1 and 2 are used to designate the various parts of the transducer 10d. It should be realized that the use of wire sensing elements will permit a very substantial overall reduction of the transducer size. As long as the support member 15 has sufficient mechanical integrity to support the transducer array, it can be used to position the two sensing elements 23a and 23b with respect to one another. Because of presently available wire sizes, and micro-manufacturing techniques, practical small size transducers can be fabricated which approach the size of a grain of rice.

FIG. 8 illustrates a cross section of a modified three element transducer 10e which is the same as the transducer 10b of FIG. 5 but wherein wire sensing elements 23a, 23b and 23c are used to replace the film sensing elements 11a, 11b and 11c. The same reference numerals as used in FIGS. 5 and 7 are used to designate the various parts of the transducer 10e. All three wire sensing elements 23a, 23b and 23c are shown connected to the central support portion 15a by connective bridging means 12a, 12b and 12c. Lead wire connections 24a, 24b and 24c are attached to the respective wire sensing elements 23a, 23b and 23c, respectively, at each end thereof, by any suitable means as by welding or brazing. The lead wires 24a, 24b and 24c can be of the same material as the sensing wire elements 23a, 23b and 23c, but with a substantially larger diameter for ease of handling and reduction of lead wire resistance.

FIG. 9 illustrates a cross section of a modified three element transducer 10f which is the same as the transducer 10a of FIG. 4, but which uses a single film sensing element 11c for speed sensing, and sensing wires 23a and 23b for direction sensing. The same reference numerals as used in FIGS. 4 and 7 are used to designate the various parts of the transducer 10f.

FIG. 10 shows a perspective view of a dual type film transducer 10g which is a modification of the transducer 10 of FIGS. 1 and 2, and which is provided with a straight support member 15 rather than the U-shaped wire support member 15 of FIGS. 1 and 2. The same reference numerals as used in FIGS. 1 and 2 are used to designate the various parts of the transducer 10g. Axial flow along the length of the straight support member 15, as well as flow across the straight support member 15 will generate a turbulent wake as in the case of the U-shaped wire support member 15 previously described hereinbefore. The use of a straight support member 15 also lends itself to the three element transducer of FIG.

3, as well as the use of wire sensing elements in place of the several film sensing elements. The use of several transducers 10g supported on and along the same straight support member 15 would permit microscale profiling applications in fluid flow investigations where it is desired to investigate the continuous directional behavior of the flowing fluid around bodies such as wind tunnel test models.

Figure 11:
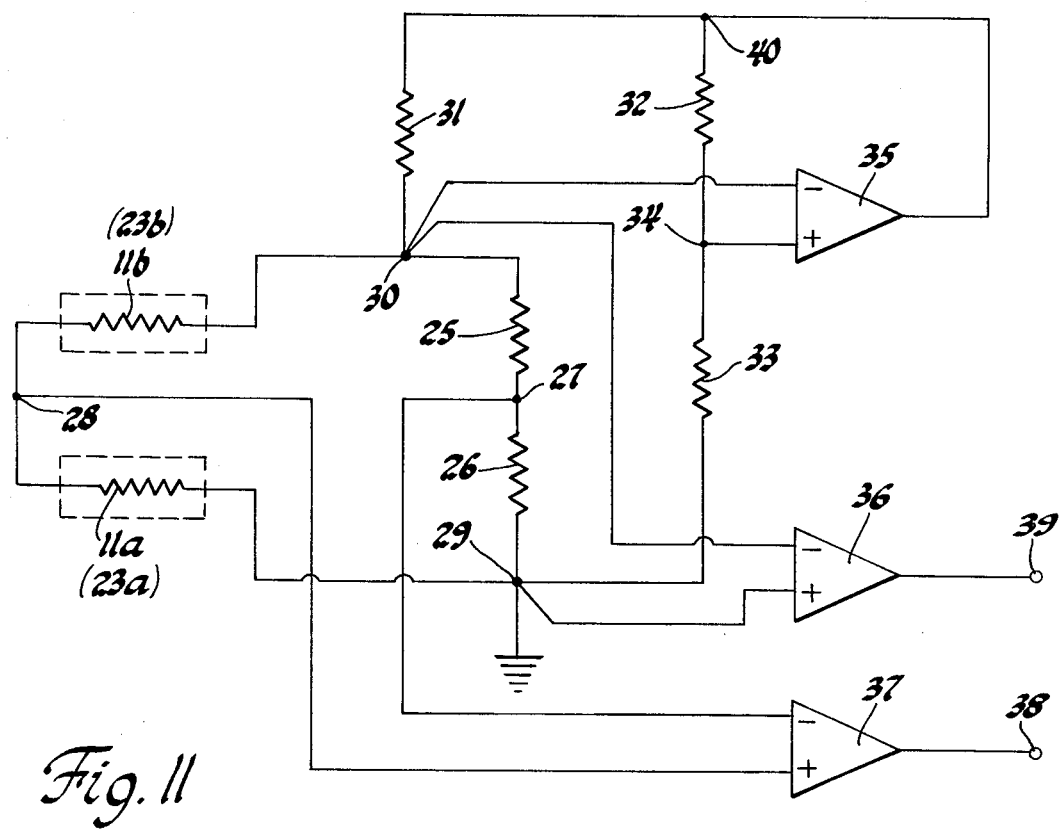
FIG. 11 is a simplified electrical schematic drawing which illustrates excitation and readout means for a dual sensing element transducer of the type illustrated in FIGS. 1 and 10.

FIG. 11 is a simplified schematic diagram of an electrical excitation and readout circuit which may be used to drive the dual type element transducers, such as those shown in FIGS. 1, 7 and 10, and which may be used to provide both speed and direction signals from the driven transducer. The direction sensing pair of elements 11a and 11b, or 23a and 23b, is shown connected as two arms of a four arm wheatstone bridge which is also formed by resistors 25 and 26. The resistors 25 and 26 are used to balance the bridge when the fluid medium surrounding the transducer is at rest or at zero speed. Excitation for the bridge of FIG. 11 is provided at connections 29 and 30, and bridge balance between points 27 and 28 is detected and is amplified by a differential amplifier 37, thereby providing a signal 38 which is a measure of the degree of balance or imbalance of the direction bridge. The signal 38 shows imbalance by swinging to either positive or negative polarity when one or the other of the paired sensing elements 11a or 11b is ventilated at a greater speed. The bridge formed by the resistors 25 and 26, together with the pair of sensing elements 11a and 11b can be considered to be electrically as a single resistor which in turn becomes one arm of a second Wheatstone bridge which is formed by a power resistor 31 in series with the first Wheatstone bridge, or direction bridge, and by resistors 32 and 33 which are used to balance the second bridge at an operating point determined by the values of resistor 32 and 33. Either resistor 32 or 33 can be varied at the time of bridge design or a potentiometer or variable resistor may be used for one or the other, but not both. This allows operator selection of operating point and instrument sensitivity. Amplifier 35 is a differential amplifier having a high current output which is fed back in closed loop fashion to the bridge at point 40. The input to amplifier 35 is taken across the bridge at points 30 and 34, and attention must be paid to phasing, in order to assure that negative feedback is used.

Differential amplifier 36 is connected across the direction bridge at points 29 and 30, and it is used to determine the fluid speed against sensing elements 11a and 11b as if they were a single element. Sensing elements 11a and 11b, together with resistors 25 and 26, appear to amplifier 36 to function as a single resistance source which is sensitive to any variation in its constituent parts. The sensing elements 11a, and 11b, are in fact non-zero temperature coefficient resistors, and when platinum metal is used for the film, the temperature coefficient is a high positive value. This fact permits the setting of the values of the resistors 32 and 33 so that the bridge balance resistance values required for bridge balance are satisfied when the total series-parallel resistance of the direction bridge, taken as a single resistance, together with power resistor 31, both balance against resistors 32 and 33 by having the same resistance ratios on either side of the bridge. The active side is comprised of resistor 31 together with the direction bridge. The reference side is comprised of resistors 32 and 33.

When the sensing elements 11a and 11b are cold or are non-operating, their resistance is lower than their operating value, and in controlling their operating value through the setting of the reference resistance ratio, the heated resistance values required to self-balance the bridge can be selected, all of which is controlled through means of negative feedback through amplifier 35 back to the bridge at point 40. The feedback loop operates to automatically adjust the current through the total bridge combination until the resistance of sensing elements 11a and 11b attains that value of resistance which balances the bridge. A small offset voltage must be present at the output of amplifier 35 when the circuit is first turned on, and the elements are at ambient temperature, so that the minute bridge current which flows as a result of the offset voltage is sufficient to develop a small error signal between points 30 and 34, thus permitting the circuit to turn itself on to an operating condition. The aforedescribed mode of operation has been described as a constant temperature (constant resistance) method of hot wire or hot film anemometer operation.

In a typical circuit, the resistance of each of the sensing elements 11a and 11b is 3.3 ohms each at room temperature. Precautions must be taken when the temperature sensitive resistor values are to be measured. The power resistor 31 is 2 ohms, and it has a low temperature coefficient of resistance, and adequate physical size, so that self-heating does not cause appreciable change in its nominal resistance value with varying current levels. For the transducer 10 of FIGS. 1 and 2, which is built to the scale indicated by the examples, typical zero speed current levels may be in the 0.1 ampere range, and at maximum flow, current levels could be measured near one ampere for an extreme case. Resistor 32 is 499 ohms and may be a precision film or wire-wound resistor. Values of resistors 25 and 26 are 20,000 or 30,000 ohms each, so as to avoid needless loading of the sensing elements 11a and 11b. A value of about 2,245 ohms for resistor 33 will cause the direction bridge total resistance to rise to 9 ohms, thereby balancing the bridge. The resulting surface temperature of sensing elements 11a and 11b will be in the 125 to 135 degree Celsius range.

Output 38 is bi-polar and indicates which sensing element, 11a or 11b, faces the impinging fluid flow. The sensing element facing the flow will be caused to be lower in resistance than the sensing element away from the flow which will increase in resistance while their total series resistance remains constant. The output 39 is uni-polar, and it provides a measure of speed which is non-linear, indicating the amount of heat lost to the flowing mass of the fluid stream.

Amplifiers 35, 36 and 37 can be integrated circuit operational amplifiers, which are operated from positive and negative 12 or 15 volt power sources. Fifteen volt operation can produce at least ten volt signal swings at the outputs 38 and 39. When two or more similar FIG. 11 bridge circuits are used, with an array of two or more transducers, proper ground and power supply circuit wiring must be provided in order to avoid unwanted cross talk between transducers and resulting failure to operate.

Figure 12:
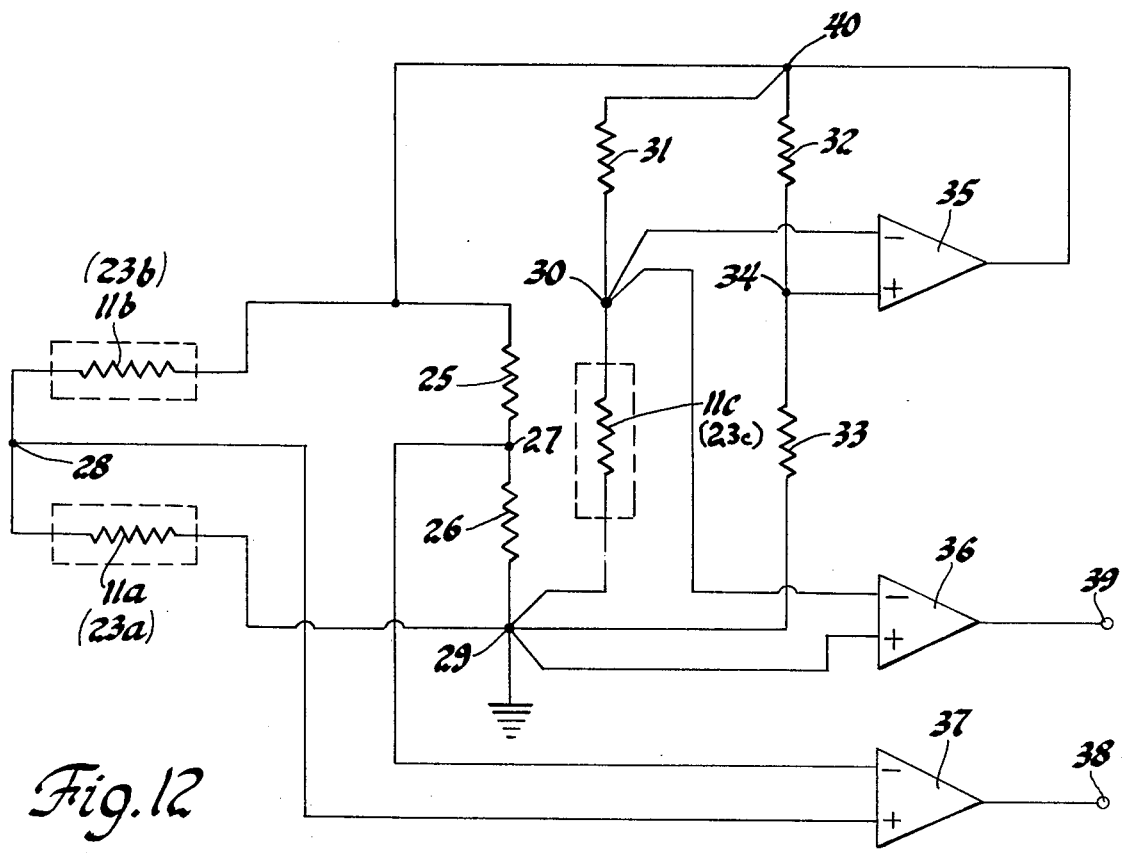
FIG. 12 is a simplified electrical schematic drawing which illustrates excitation and readout means for a three sensing element transducer of the type illustrated in FIG. 3.

FIG. 12 is a simplified schematic diagram of an electrical excitation and readout circuit which may be used to drive three element transducers such as those shown in FIGS. 3, 5, 6, 8 and 9, and which may be used to provide both speed and direction signals from the driven transducer. The major difference between the circuit of FIG. 12 and the circuit of FIG. 11 is that the direction bridge, sensing elements 11a and 11b and resistors 25 and 26, has been removed from within the feedback controlled bridge which is now formed by the third speed sensing element 11c and resistors 31, 32 and 33. The direction bridge is now slaved to the current output of amplifier 35 at connection point 40, and it operates as if it were separately operated as a constant temperature transducer, so long as the sensing elements have similar ohmic values as described for the circuit, FIG. 11.

The operation of the circuit of FIG. 12 is similar to that of the FIG. 11 circuit. However, the wind speed signal will be matched more closely, from side to side, since the sensing element 11c is used for all wind speed measurements, rather than two sensing elements 11a and 11b, which can never be quite matched so as to be identical as passive resistors and as active heat transfer sensing elements. It is this mis-match, no matter how slight, which causes different sensitivity or "lobe imbalance" when a combined graphical polar plot of fluid speed and direction, taken at constant fluid speed, is displayed and inspected.

FIG. 13 is a perspective view of a directional heat loss anemometer transducer 10h of the type shown in FIGS. 1 and 2, and which is modified by the addition of an upper second pair of cylindrical sensing elements or members 11d and 11e, which are mounted above and parallel to the central portion 15a of the support member 15. The same reference numerals as used in FIGS. 1 and 2 are used to designate the various parts of the transducer 10h. The sensing elements 11d and 11e are symmetrically parallel to the sensing elements 11a and 11b, although the sensing elements 11d and 11e may be separated from each other more than, or less than, the separation between the sensing elements 11a and 11b. Sensing elements 11d and 11e are secured in place by small amounts of adhesive 41a and 41b at one end of the conductors and adhesive 42a and 42b at the opposite end. The sensing elements 11d and 11e are provided with electrical connection means 13d and 13e at one end, and 14d and 14e at the other end, and with attached lead wires 17d and 17e, and 16d and 16e, respectively.

Omission of a continuous connecting bridge between the sensing elements 11d and 11e, and the central portion 15a of the support member 15, together with adjustment of their angular disposition around the cylindrical support member 15 can be advantageously used to modify their spatial or polar response to fluid flow. Generally, a sensing element pair which has blocked or interrupted flow over a portion of its cross section will, for 360 degree planar flow in a polar plot, produce a polar response characteristic which is greater than an ideal cosine function. For a sensing element pair which has a free flow over its circumference, the general polar response is usually less than an ideal cosine function. These characteristics can be electrically combined and processed for those applications demanding the best possible polar characteristic from the instrument transducer.

Figure 14:
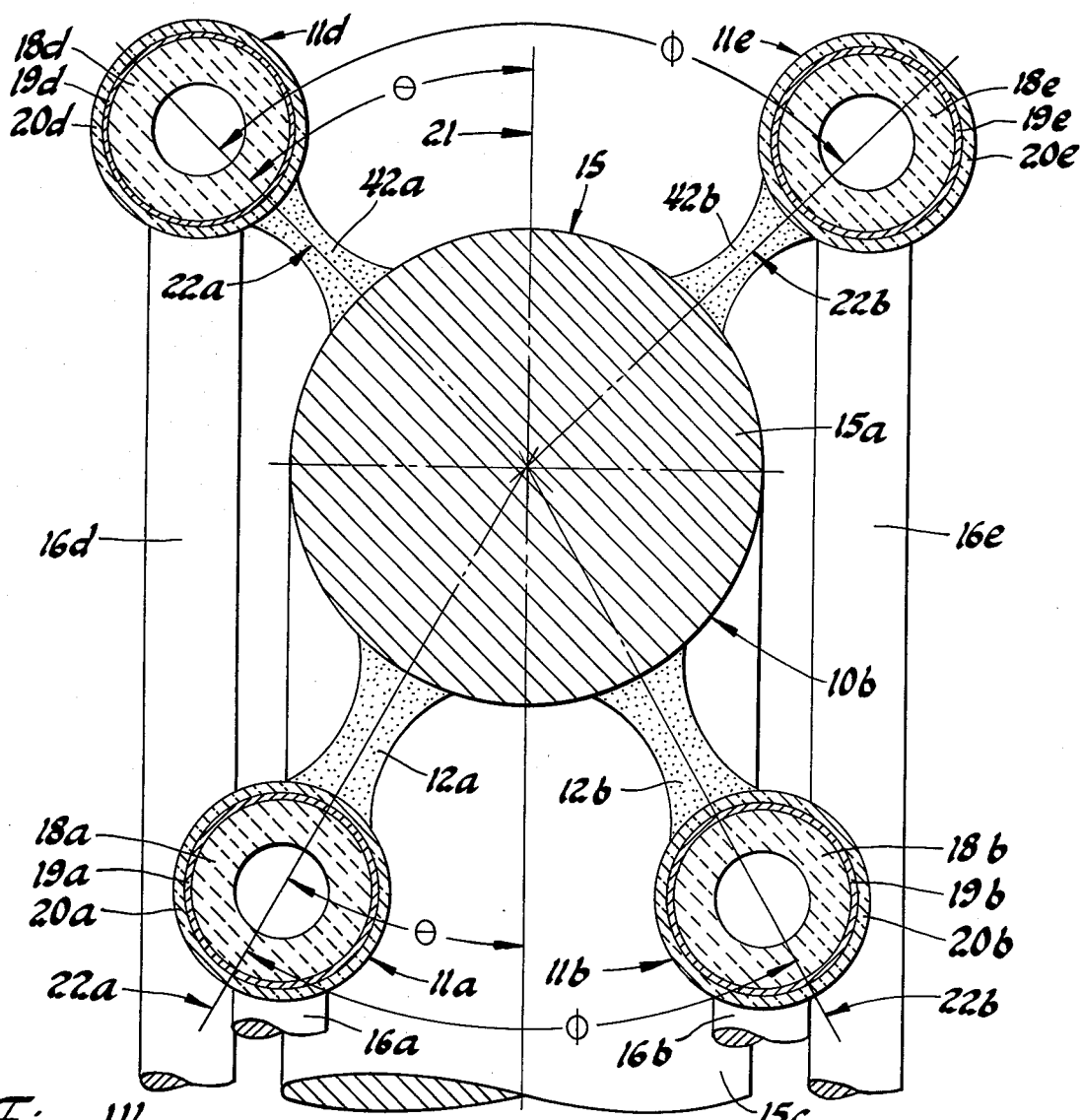
FIG. 14 is an elevational section view of the directional heat loss anemometer transducer structure illustrated in FIG. 13, taken along the line 14—14 thereof, and looking in the direction of the arrows.

FIG. 14 illustrates a typical cross section for a directional heat loss anemometer transducer 10h of the type shown in FIG. 13. The additional pair of sensing elements 11d and 11e are shown supported above the transducer structure of FIG. 1. Although film sensing elements are shown for both sensing element pairs, 11a and 11b together with 11d and 11e, either or both pairs may be constructed from round wires having solid cross section. The use of wire sensing elements will permit fabrication of substantially smaller anemometer transducer arrays, since the size of available practical oxide ceramic materials together with intrinsic mechanical strength limitations becomes a factor when film transducers are fabricated. Reduction in size of film transducers can be effected by using substrate materials in the glass or quartz families.

Figure 15:
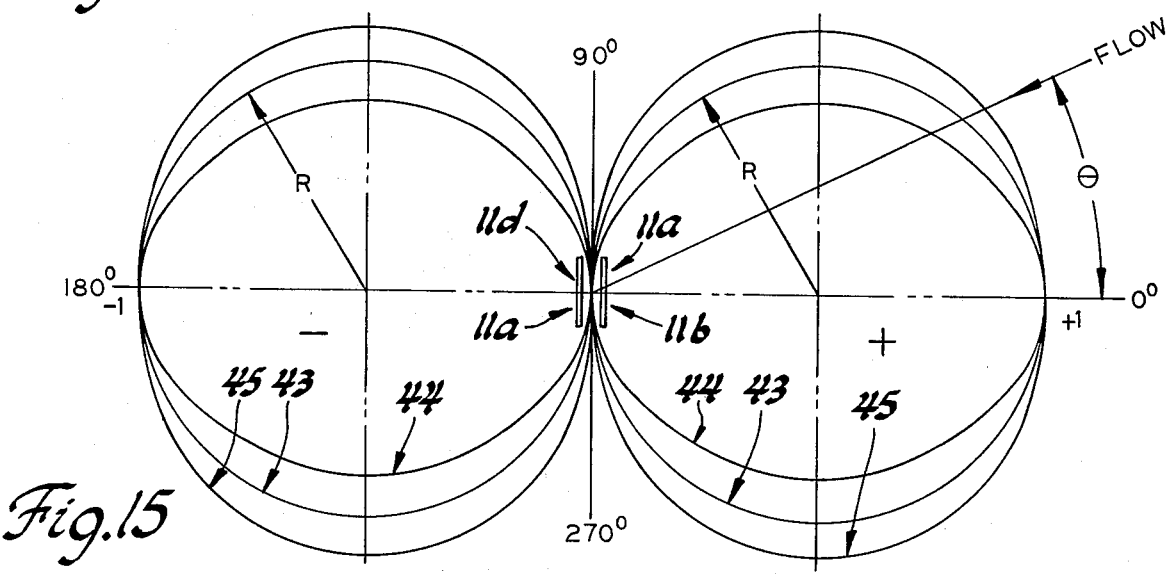
FIG. 15 is a graphical polar plot of the directional response of the direction heat loss anemometer transducer illustrated in FIG. 13.

FIG. 15 is a graphical plot of the polar directional response of the heat loss anemometer transducer 10h of FIG. 13, where the orientation of the plot is a view looking down upon the transducer 10h with the response plane parallel to the plane containing the parallel axes of direction sensing elements 11a and 11b, or direction sensing elements 11d and 11e. The ideal cosine, 43, is plotted as two circles of radius R, one having positive polarity and the other having negative polarity. An example of the response which may be expected for a pair of sensing elements 11a and 11b, which is bridged or connected to a cylindrical supporting member is shown by curve 45, where the output lies outside of the ideal cosine function. The response of an unconnected or unbridged pair of sensing elements 11d and 11e falls inside the ideal cosine function, and it is shown by curve 44.

While there have been shown and described the preferred embodiments of the invention, it is understood that various changes, omissions, and substitutions may be made by those skilled in the art.

What is claimed is:

1. A directional heat loss anemometer transducer comprising:
   (a) at least two similar, thermally and physically separated cylindrical resistive electrical conductors;
   (b) each of said conductors having a length at least equal to the largest cross section dimension of the conductor;
   (c) a cylindrical support member centrally disposed between and alongside said two resistive electrical conductors;
   (d) said cylindrical support member having a straight central portion and a mounting portion at each end of said central portion;
   (e) said electrical conductors being disposed as a parallel pair finitely separated, and mounted parallel to and in close proximity to the straight central portion of the cylindrical support member;
   (f) said cylindrical support member straight central portion being disposed so that a plane containing the parallel central axes of said two resistive electrical conductors is spaced from the cylindrical support member central portion and is perpendicular to a plane containing the central axis of said cylindrical support member straight central portion and disposed between said two resistive electrical conductors, said cylindrical support and resistive electrical conductor axial centers defining an acute angle between center lines through each of said resistive electrical conductors and said cylindrical support when viewed in cross section;
   (g) a thermo insulating connective bridging means operatively disposed between each of said two resistive electrical conductors and said support member straight central portion, and closing the space between said resistive electrical conductors and said support member straight central portion, thereby preventing connected flow completely around one conductor of said two resistive electrical conductors, independent of the other conductor;

(h) said two resistive electrical conductors being supported in the protected lee of the support member straight central portion; and, (i) each of said resistive electrical conductors being provided with electrical connection means, whereby each resistive electrical conductor can be electrically heated by an electrical current passed through each conductor.

2. A directional heat loss anemometer transducer comprising:

(a) at least two similar, thermally and physically separated cylindrical resistive electrical conductors;

(b) each of said conductors having a length at least equal to the largest cross section dimension of the conductor;

(c) a cylindrical support member centrally disposed between and alongside said two resistive electrical conductors;

(d) said cylindrical support member having a straight central portion and a mounting portion at each end of said central portion;

(e) said electrical conductors being disposed as a parallel pair finitely separated, and mounted parallel to and in close proximity to the straight central portion of the cylindrical support member;

(f) said cylindrical support member straight central portion being disposed so that a plane containing the parallel central axes of said two resistive electrical conductors is spaced from the cylindrical support member central portion and is perpendicular to a plane containing the central axis of said cylindrical support member straight central portion and disposed between said two resistive electrical conductors;

(g) a thermo insulating connective bridging means operatively disposed between each of said two resistive electrical conductors and said support member straight central portion, and closing the space between said resistive electrical conductors and said support member straight central portion, thereby preventing connected flow completely around one conductor of said two resistive electrical conductors, independent of the other conductor;

(h) said two resistive electrical conductors being supported in the protected lee of the support member straight central portion;

(i) each of said resistive electrical conductors being provided with electrical connection means, whereby each resistive electrical conductor can be electrically heated by an electrical current passed through each conductor; and, (j) said two resistive electrical conductors are wires which are solid in cross section.

3. A directional heat loss anemometer transducer comprising:

(a) at least two similar, thermally and physically separated cylindrical resistive electrical conductors;

(b) each of said conductors having a length at least equal to the largest cross section dimension of the conductor;

(c) a cylindrical support member centrally disposed between and alongside said two resistive electrical conductors;

(d) said cylindrical support member having a straight central portion and a mounting portion at each end of said central portion;

(e) said electrical conductors being disposed as a parallel pair finitely separated, and mounted parallel to and in close proximity to the straight central portion of the cylindrical support member;

(f) said cylindrical support member straight central portion being disposed so that a plane containing the parallel central axes of said two resistive electrical conductors is spaced from the cylindrical support member central portion and is perpendicular to a plane containing the central axis of said cylindrical support member straight central portion and disposed between said two resistive electrical conductors;

(g) a thermo insulating connective bridging means operatively disposed between each of said two resistive electrical conductors and said support member straight central portion, and closing the space between said resistive electrical conductors and said support member straight central portion, thereby preventing connected flow completely around one conductor of said two resistive electrical conductors, independent of the other conductor;

(h) said two resistive electrical conductors being supported in the protected lee of the support member straight central portion;

(i) each of said resistive electrical conductors being provided with electrical connecion means, whereby each resistive electrical conductor can be electrically heated by an electrical current passed through each conductor; and, (j) each of said resistive electrical conductors including a hollow tubular electrically non-conductive refractory cylindrical substrate supporting body extending the length of the conductor, and a conductive resistance film having a non-zero temperature coefficient of resistance adhered to the outer surface of the substrate body and extending over the length of the substrate body, and an overall protective coating which continuously extends over the outer surface of the conductive resistance film over the entire length of the conductive resistance film.

4. A directional heat loss anemometer transducer comprising:

(a) at least two similar, thermally and physically separated cylindrical resistive electrical conductors;

(b) each of said conductors having a length at least equal to the largest cross section dimension of the conductor;

(c) a cylindrical support member centrally disposed between and alongside said two resistive electrical conductors;

(d) said cylindrical support member having a straight central portion and a mounting portion at each end of said central portion;

(e) said electrical conductors being disposed as a parallel pair finitely separated, and mounted parallel to and in close proximity to the straight central portion of the cylindrical support member;

(f) said cylindrical support member straight central portion being disposed so that a plane containing the parallel central axes of said two resistive electrical conductors is spaced from the cylindrical support member central portion and is perpendicular to a plane containing the central axis of said cylindrical support member straight central portion and disposed between said two resistive electrical conductors;

(g) a thermo insulating connective bridging means operatively disposed between each of said two resistive electrical conductors and said support member straight central portion, and closing the space between said resistive electrical conductors and said support member straight central portion, thereby preventing connected flow completely around one conductor of said two resistive electrical conductors, independent of the other conductor;

(h) said two resistive electrical conductors being supported in the protected lee of the support member straight central portion;

(i) each of said resistive electrical conductors being provided with electrical connection means, whereby each resistive electrical conductor can be electrically heated by an electrical current passed through each conductor; and, (j) a third similar cylindrical resistive electrical conductor being mounted parallel to said first named two resistive electrical conductors and which is equidistant from each of said first named resistive two electrical conductors, and said cylindrical support member central portion being disposed between the third cylindrical resistive electrical conductor and said first named two resistive electrical conductors.

5. A directional heat loss anemometer transducer as defined in claim 4, wherein:
(a) a thermo insulating connective bridging means is operatively disposed between said third resistive electrical conductor and said support member central portion.

6. A directional heat loss anemometer transducer as defined in claim 4, wherein:
(a) said third resistive electrical conductor is unbridged to said support member central portion by said connective bridging means except at the ends of the third conductor.

7. A directional heat loss anemometer transducer as defined in either of claims 5 or 6, wherein:
(a) the three electrical conductors are wires which are solid in cross section.

8. A directional heat loss anemometer transducer as defined in either of claims 5 or 6, wherein:
(a) each of the three resistive electrical conductors includes a hollow tubular electrically non-conductive refractory cylindrical substrate supporting body extending the length of the conductor, and a conductive resistance film having a non-zero temperature coefficient of resistance adhered to the outer surface of the substrate body and extending over the length of the substrate body, and an overall protective coating which continuously extends over the outer surface of the conductive resistance film over the entire length of the conductive resistance film.

9. A directional heat loss anemometer transducer as defined in claim 5, wherein:
(a) said third resistive electrical conductor is a wire which is solid in cross section; and,
(b) each of said first two named resistive electrical conductors includes a hollow tubular electrically non-conductive refractory cylindrical substrate supporting body extending the length of the conductor, and a conductive resistance film having a non-zero temperature coefficient of resistance adhered to the outer surface of the substrate body and extending over the length of the substrate body, and an overall protective coating which continuously extends over the outer surface of the conductive resistance film over the entire length of the conductive resistance film.

10. A directional heat loss anemometer transducer as defined in either of claims 5 or 6, wherein:
(a) said first two named resistive electrical conductors are wires which are solid in cross section; and,
(b) said third resistive electrical conductor includes a hollow tubular electrically non-conductive refractory cylindrical substrate supporting body extending the length of the conductor, and a conductive resistance film having a non-zero temperature coefficient of resistance adhered to the outer surface of the substrate body and extending over the length of the substrate body, and an overall protective coating which continuously extends over the outer surface of the conductive resistance film over the entire length of the conductive resistance film.

11. A directional heat loss anemometer transducer comprising:
(a) at least two similar, thermally and physically separated cylindrical resistive electrical conductors;
(b) each of said conductors having a length at least equal to the largest cross section dimension of the conductor;
(c) a cylindrical support member centrally disposed between and alongside said two resistive electrical conductors;
(d) said cylindrical support member having a straight central portion and a mounting portion at each end of said central portion;
(e) said electrical conductors being disposed as a parallel pair finitely separated, and mounted parallel to and in close proximity to the straight central portion of the cylindrical support member;
(f) said cylindrical support member straight central portion being disposed so that a plane containing the parallel central axes of said two resistive electrical conductors is spaced from the cylindrical support member central portion and is perpendicular to a plane containing the central axis of said cylindrical support member straight central portion and disposed between said two resistive electrical conductors;
(g) a thermo insulating connective bridging means operatively disposed between each of said two resistive electrical conductors and said support member straight central portion, and closing the space between said resistive electrical conductors and said support member straight central portion, thereby preventing connected flow completely around one conductor of said two resistive electrical conductors, independent of the other conductor;
(h) said two resistive electrical conductors being supported in the protected lee of the support member straight central portion;
(i) each of said resistive electrical conductors being provided with electrical connection means, whereby each resistive electrical conductor can be electrically heated by an electrical current passed through each conductor; and, (j) another two cylindrical resistive electrical conductors being mounted opposite to said first named two electrical conductors, with said support member central portion being disposed between the first named two resistive conductors, and said another two resistive conductors.

12. A directional heat loss anemometer transducer as defined in claim 11, wherein:
    (a) a thermo insulating connective bridging means is operatively disposed between said another two resistive electrical conductors and said support member central portion.

13. A directional heat loss anemometer transducer as defined in claim 12, wherein:
    (a) said another two resistive electrical conductors are positioned close to said cylindrical support member central portion and are unbridged to said support member central portion by said connective bridging means except at the ends of the conductors.

14. A directional anemometer transducer as defined in either of claims 12 or 13, wherein:
    (a) said resistive electrical conductors are wires which are solid in cross section.

15. A directional heat loss anemometer transducer as defined in either of claims 12 or 13, wherein:
    (a) each of said resistive electrical conductors includes a hollow tubular electrically non-conductive refractory cylindrical substrate supporting body extending the length of the conductor, and a conductive resistance film having a non-zero temperature coefficient of resistance adhered to the outer surface of the substrate body and extending over the length of the substrate body, and an overall protective coating which continuously extends over the outer surface of the conductive resistance film over the entire length of the conductive resistance film.

16. A directional heat loss anemometer transducer as defined in any one of claims 1, 2, 3, 4, 5, 6, 9, 11, 12 or 13, wherein:
    (a) said centrally disposed cylindrical support member is a straight cylindrical bar.

17. A directional heat loss anemometer transducer as defined in any one of claims 1, 2, 3, 4, 5, 6, 9, 11, 12 or 13, wherein:
    (a) said centrally disposed cylindrical support member is U-shaped with the mounting portion at each end being perpendicular to the central portion.

* * * * *

UNITED STATES PATENT OFFICE
CERTIFICATE OF CORRECTION

Patent No. 4,206,638                     Dated    June 10, 1980

Inventor(s)    Robert S. Djorup

It is certified that error appears in the above-identified patent and that said Letters Patent are hereby corrected as shown below:

Column 2, line 40, delete "briding" and insert --bridging--.

Signed and Sealed this

Twelfth Day of August 1980

[SEAL]

Attest:

SIDNEY A. DIAMOND

Attesting Officer

Commissioner of Patents and Trademarks